United States Patent [19]

Moseley

[11] Patent Number: 5,295,560
[45] Date of Patent: Mar. 22, 1994

[54] THERMALLY BALANCED BRAKE STACK

[75] Inventor: Douglas D. Moseley, Uniontown, Ohio

[73] Assignee: Aircraft Braking Systems Corporation, Akron, Ohio

[21] Appl. No.: 84,082

[22] Filed: Jun. 28, 1993

Related U.S. Application Data

[63] Continuation of Ser. No. 724,615, Jul. 2, 1991, abandoned.

[51] Int. Cl.$^5$ .............................................. F16D 55/02
[52] U.S. Cl. ................................... 188/71.5; 188/71.7; 188/264 A; 188/218 XL
[58] Field of Search .................... 188/71.3, 71.5, 71.6, 188/196 M, 218, 250 B, 264 A, 264 AA; 192/70.19, 70.20, 70.21, 70.12; 244/110 H, 111

[56] References Cited

U.S. PATENT DOCUMENTS

| | | | |
|---|---|---|---|
| 3,712,427 | 1/1973 | Cook et al. | 188/218 XL |
| 4,613,017 | 9/1986 | Bok | 188/218 XL |
| 4,742,895 | 5/1988 | Bok | 188/71.5 |
| 4,977,985 | 12/1990 | Wells et al. | 188/250 B |

FOREIGN PATENT DOCUMENTS

| | | | |
|---|---|---|---|
| 2004091 | 5/1990 | Canada | 188/71.5 |
| 46-29689 | 8/1971 | Japan | 188/71.5 |

*Primary Examiner*—Robert J. Oberleitner
*Assistant Examiner*—Chris Schwartz
*Attorney, Agent, or Firm*—Renner, Kenner, Greive, Bobak, Taylor & Weber

[57] ABSTRACT

A thermally balanced brake disc stack provides brake discs of greater mass at the center of the stack and of lesser mass at the opposite ends of the stack. The temperature of the high mass discs in the center of the stack will rise to a lower level than the thinner discs at the ends of the stack. However, the heat dissipation rate at the ends of the stack exceeds that at the center of such that all of the discs cool to a predetermined temperature concurrently.

13 Claims, 1 Drawing Sheet

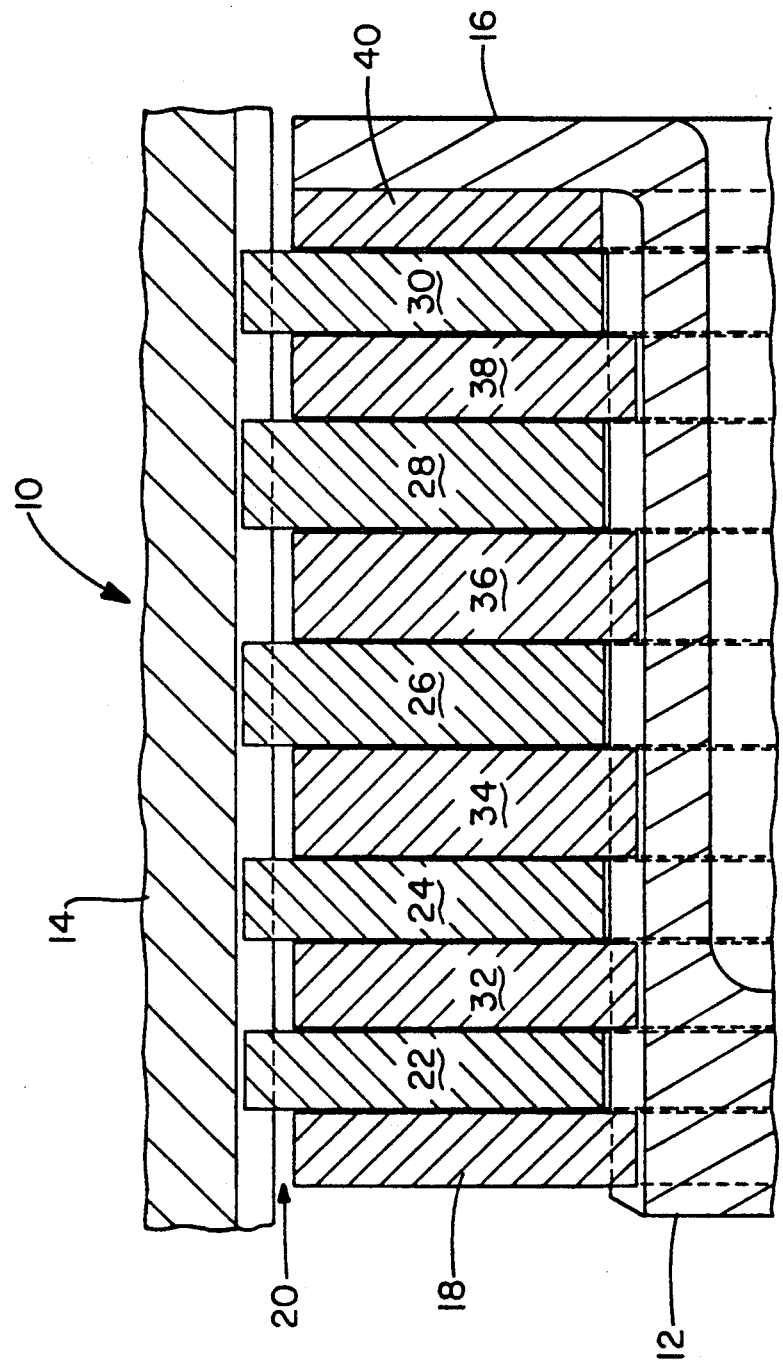

THERMALLY BALANCED BRAKE STACK

This is a continuation of application Ser. No. 07/724,615, filed Jul. 2, 1991, now abandoned.

TECHNICAL FIELD

The invention herein resides in the art of braking systems for vehicles. More particularly, the invention relates to braking systems for aircraft. Specifically, the invention presents a thermally balanced brake disc stack for an aircraft braking system allowing quick turnaround time of the aircraft.

BACKGROUND ART

It is well known that heat in vehicle braking systems is generally deleterious to the system, both structurally and functionally. It is further well known that aircraft often employ braking systems having brake disc stacks comprised of interleaved discs. The discs are alternately splined to the wheel and torque tube such that alternating rotor and stator discs are present within the stack. A stationary end plate is provided at one end of the stack, while an axially movable pressure plate is provided at the other. The application of force to the pressure plate urges the stator and rotor discs into frictional engagement with each other, providing the braking activity from the aircraft.

Presently known aircraft brake discs are made of steel, carbon, or appropriate composites. Irrespective of the type of material employed, tremendous heat is generated in the brake disc stack during a landing operation. While the brake discs typically begin to cool immediately following landing, the braking operations incident to taxiing generate heat in the stack, retarding the effective cooling thereof. While modern materials such as carbon and other composites are provided to withstand the high braking temperatures encountered, safety considerations preclude use of the aircraft following braking operations for a sufficient period of time to allow the brake discs to cool below a set temperature.

In the aircraft industry, each aircraft has a characteristic turnaround or ground waiting time. This is the time required for the hottest brake disc in the brake disc stack to cool below a specific temperature. For example, several aircraft manufacturers require the temperature of the hottest brake disc to be below the ignition point of the hydraulic brake fluid prior to take-off. The turnaround time characteristic is a function of the aircraft landing speed, mass, brake system characteristics, taxiing procedures, and the like. The turnaround time is, of course, substantially inactive ground time. As such, it is costly in the operation of aircraft, for aircraft generate revenues in the air, not on the ground.

To maximize braking efficiency, it is most desirable to minimize turnaround time and to maximize the brake cooling rate. In other words, it is most desirable to minimize the temperatures that the brake discs reach, while maximizing the rate of heat dissipation within the stack.

In the past, brake disc stacks have been formed with discs of generally uniform thickness. Extensively instrumented tests have shown that discs in the center of the stack cool the slowest, and thereby establish the turnaround time of the associated aircraft. While brake disc material may favorably impact heat dissipation rates, no previous consideration has been given to the thickness and positioning of the discs as a means of achieving such heat dissipation.

DISCLOSURE OF INVENTION

In light of the foregoing, it is a first aspect of the invention to provide a brake disc stack for an aircraft which is thermally balanced.

Another aspect of the invention is the provision of a brake disc stack for an aircraft which is geometrically configured to optimize heat dissipation.

Still a further aspect of the invention is the provision of a brake disc stack for an aircraft wherein the thickness of each of the discs of the stack is a direct function of the proximity of the disc to the center of the stack.

Another aspect of the invention is the provision of a thermally balanced brake disc stack which is conducive to periodic servicing changes of the discs.

An additional aspect of the invention is the provision of a thermally balanced brake disc stack which is reliable and durable in operation, while being conductive to implementation with state of the art materials and systems.

The foregoing and other aspects of the invention which will become apparent as the detailed description proceeds are achieved by a thermally balanced brake disc stack, comprising: a plurality of stator discs; a plurality of rotor discs interleaved with said stator discs; a pressure plate at a first end of the stack; an end plate at a second end of the stack; and wherein said stator and rotor discs at said first and second ends are thinner than said stator and rotor discs at the center portion of the stack.

Yet further aspects of the invention are attained by a brake disc stack, comprising: a first plurality of rotor discs at a first end of the stack; a second plurality of rotor discs at a second end of the stack; a third plurality of rotor discs at a center portion of the stack; a first plurality of stator discs at said first end of the stack; a second plurality of stator discs at said second end of the stack; a third plurality of stator discs at said center portion of the stack; and wherein said rotor and stator discs are interleaved, said first and second pluralities of said rotor discs are thinner than said third plurality of rotor discs, and said first and second pluralities of said stator discs are thinner than said third plurality of said stator discs.

DESCRIPTION OF DRAWING

For a complete understanding of the objects, techniques and structure of the invention reference should be made to the following detailed description and accompanying drawing wherein a cross sectional view of a thermally balanced brake disc stack according to the invention may be seen.

BEST MODE FOR CARRYING OUT THE INVENTION

Applicant has found that during braking operations the center of the brake disc stack builds to the highest temperature and is most difficult to cool. Further, applicant has found that the fastest cooling or heat dissipation in the brake disc stack is at the ends of the stack. Typically, the fastest heat dissipation rates are achieved at the end of the stack near the pressure plate, while the second fastest rate of heat dissipation is at the opposite end of the stack, receiving the end plate.

It is also known that the rate of temperature rise in a brake disc is inversely proportional to its mass. Accordingly, applicant has determined to devise a brake disc stack with thicker discs at the center so that the temperature rise or rate of temperature increase will be minimized there. Further, thinner discs are to be placed at the ends of the brake disc stack such that, though the temperature reached in said discs will be greater than in the center of the stack, the heat will more quickly dissipate because of the position of such discs near the end of the stack.

Since braking activity occurs at the interface of frictional surfaces of the discs, the thicknesses of the discs, within reasonable constraints, do not impact braking effectiveness. Accordingly, it is reasonable to vary the thicknesses of the discs within the stack without impairing braking effectiveness, but while increasing braking efficiency.

Referring now to the drawing, it can be seen that a brake disc system according to the invention is designated generally by the numeral 10. As shown, the system 10 includes a stationary torque tube assembly 12 and a rotating wheel assembly 14. Such structures are, of course, well known and understood by those skilled in the art. At one end of the system 10 is a back plate 16 fixed to the torque tube 12. At the opposite end, a pressure plate 18 is movable axially with respect to the torque tube 12 upon the urging of the appropriate brake pistons or the like. A brake disc stack 20 is interposed between the back plate 16 and pressure plate 18. As will be understood by those skilled in the art, a carbon end plate 40 is affixed to the back plate 16.

Those skilled in the art will readily appreciate that rotor discs 22–30 are splined or keyed to the wheel 14 to be rotational therewith about the torque tube 12. In somewhat similar fashion, stator discs 32–38 are splined or otherwise keyed to the torque tube 12 and prevented from rotational movement. Those skilled in the art will readily understand that the rotor and stator discs 22–38 are adapted for axial movement with respect to the torque tube 12 and move in that manner under the application of force upon the pressure plate 18 to achieve the braking operation. Each of the discs 22–38 has a pair of friction surfaces for engagement with corresponding friction surfaces of the discs on either side thereof. In the preferred embodiment of the invention, the inner faces of the end plate 40 and pressure plate 18 are also friction surfaces, participating in the braking operation.

In a typical braking operation, application of brake force to the pressure plate urges the rotor discs 22–30 and stator discs 32–38 into frictional contacting engagement with each other, and against the end plate 40. With the rotor discs 22–30 being interconnected to the wheel 14, and the stator discs 32–38 being splined to the torque tube 12, necessary braking operation is achieved. Such operation is standard with most aircraft braking systems. As presented earlier, in such systems the discs near the center of the stack will typically build to the highest temperature and be the most difficult to cool. Additionally, it has been found that the discs nearer the pressure plate 18 and end plate 40 will cool the fastest, with the fastest cooling discs being nearest the pressure plate 18. The pressure and end plate discs are more exposed to convection cooling, and thermally connected to cooler portions of the wheel and brake assembly, thus accounting for their noted higher cooling rates. To take advantage of this feature, the discs of the stack 20 are sized and arranged in the unique manner presented below.

To minimize the heat buildup and to optimize the heat dissipation characteristics of the brake disc system 10, the discs 26, 28, 34, 36 which are internal of the stack 20 are thicker than the discs 22, 24, 30, 32, 38 at the ends of the stack 20. With the discs 26, 28, 34, 36 being thicker, but having the same diameter and surface area of their counterparts 22, 24, 30, 32, 38, it will be appreciated that the interior discs have a larger mass than the discs at the ends of the stack 20. Accordingly, during braking operations the temperature of the interior discs 26, 28, 34, 36 rises slower and, hence, to a lower level than the temperature of the exterior discs 22, 24, 30, 32, 38 which are necessarily of a lower mass. However, these discs positioned at the ends of the stack 20 cool faster and, accordingly, will reach the predetermined acceptable temperature threshold for the turnaround time or take-offs at about the same time as the inner discs 26, 28, 34, 36.

It will be appreciated that in the embodiment shown in the drawing there are an odd number of discs in the system. In this instance, since the end of the stack 20 nearest the pressure plate 18 cools the fastest, three of the thin discs 22, 24, 32 are positioned adjacent the pressure plate, while only two of the thinner discs, 30, 38 are positioned at the end adjacent the end plate 40. It will be understood that if another disc pair were added to the system, then two thin discs would be at each of the ends 16, 18, to thermally balance the stack.

It will be appreciated that the invention contemplates servicing of the disc stack 20 at the half life cycle of the thick discs 26, 28, 34, 36. It is further contemplated that, at the half life cycle of the thick discs, such thick discs would be of a thickness approximating that of the thinner discs at the ends of the stack 20 and can be used as such. In other words, when the inner thick discs wear down to one half of the wear allowance, they are then moved to the ends of the stack 20 to be used as thin discs. The thin discs are at that time discarded or combined and refurbished as thick discs, for their full wear allowance has been used. In this manner, only the thick discs 26, 28, 34, 36 are replaced at service cycles. The worn out thin discs are replaced with the worn thick discs which are, at that time, worn to the thickness of a "new" thin disc.

In a preferred embodiment of the invention, the thick rotor discs 26, 28 would have a thickness of 1.11 inch. The thin outer rotor discs 22, 24, 30 would have a thickness of 0.854 inch. Assume that the wear on each face of the discs of the stack is 0.108 inch after 1500 landings. Assume also that when the thick rotor discs 26, 28 are to be used as thin discs, they will be machined or "turned" an additional 0.020 inch on each face. Accordingly, each face would be reduced by 0.128 inch with a total reduced thickness of 0.256 inch. It can thus be seen that the thick rotor discs 26, 28 which began with a thickness of 1.11 inch will then equal the thickness of a thin rotor disc 22, 24, 30 which is 0.854 inch, achieved by reducing the thick rotor discs by the 0.256 wear and machining levels.

Considering now the stator discs. In a preferred embodiment, the thick stator discs 34, 36 have a thickness of 1.206 inch, while the thin stator discs 32, 38 have a thickness of 0.950 inch. Again, assuming that after 1500 landings each face is worn 0.108 inch, and that each of the thick stator discs 34, 36 is dressed down 0.020 inch, each face of each of the stator discs 34, 36 will be reduced by 0.128 inch, such that the total thickness of the stator discs 34, 36 will be reduced to 0.256 inch. Accordingly, it can be seen that the thick stator disc beginning at 1.206 inch, which is ultimately reduced by 0.256 inch, can then be used as a thin stator disc having a thickness of 0.950 inch.

In the foregoing, it will be appreciated that each of the thick discs is designed to achieve 3000 landings, 1500 landings as a thick disc, and an additional 1500 landings as a thin disc. In other words, each of the faces will be allowed to wear 0.216 inch from braking operations. Each face will also experience a machining loss of 0.02 inch such that the total usable thickness of each "thick" disc is 0.236 inch. It will further be appreciated that the recited dimensions are given by way of example only. Disc thicknesses and sizes vary greatly over a range of aircraft presently in service. Accordingly, the dimensions stated here are illustrative only, and not intended to limit the concept of the invention.

It should now be readily apparent to those skilled in the art that the concept of the invention is to place discs of greater mass in the center of the brake disc stack, with discs of lesser mass at the ends of the disc. While the discs of lesser mass will heat to a higher temperature, they will also cool more quickly due to their positioning at the ends of the disc stack. The higher mass discs in the center of the stack will not rise to as high of a temperature level and, accordingly, will not need to cool as much as the thinner discs to reach the turnaround temperature. In other words, those discs positioned for higher rates of heat dissipation will be allowed to rise to higher temperature, while those demonstrating lower rates of heat dissipation will be configured to rise to lower temperature.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

While the specific ratio of the thickness of a thick disc to that of a corresponding thin disc, be it stator or rotor, will vary as a function of the aircraft, it has been found that such ratio lies between 1.3:1 and 1.5:1. Accordingly, a thick rotor disc will be between 1.3 and 1.5 times the thickness of a thin rotor disc, and a thick stator disc will be between 1.3 and 1.5 time the thickness of a thin stator disc.

What is claimed is:

1. A thermally balanced brake disc stack, comprising:
a plurality of stator discs;
a plurality of rotor discs interleaved with said stator discs;
a pressure plate at a first end of the stack;
an end plate at a second end of the stack; and
wherein a stator disc and a rotor disc at each of said first and second ends are thinner than said stator and rotor discs at a center portion of the stack such that, during braking operations employing the brake disc stack, said stator and rotor disc at each of said first and second ends will rise to higher temperatures and cool more quickly than said stator and rotor discs at said center portion of the stack.

2. The thermally balanced brake disc stack according to claim 1, wherein stator and rotor discs at said center portion of the stack exceed a thickness of said stator disc and said rotor disc at each of said first and second ends of the stack by a wear allowance.

3. The thermally balanced brake disc stack according to claim 2, wherein said stator and rotor discs at said center portion of the stack further exceed a thickness of said stator disc and said rotor disc at each of said first and second ends of the stack by an amount allowing for dressing frictional surfaces of said stator and rotor discs at said center portion after wear to serve as respective stator and rotor discs at said first and second ends of the stack.

4. The thermally balanced brake disc stack according to claim 2, wherein a number of said thinner discs at said first end of the stack exceeds a number of said thinner discs at said second end of the stack.

5. The thermally balanced brake disc stack according to claim 2, wherein said stator discs are thicker than corresponding rotor discs.

6. A brake disc stack, comprising:
a first rotor disc at a first end of the stack;
a second rotor disc at a second end of the stack;
a plurality of rotor discs at a center portion of the stack;
a first stator disc at said first end of the stack;
a second stator disc at said second end of the stack;
a plurality of stator discs at said center portion of the stack; and
wherein said rotor and stator discs are interleaved, said first and second rotor discs are thinner than said plurality of rotor discs, and said first and second pluralities of stator discs are thinner than said plurality of said stator discs such that, during braking operations employing the brake disc stack, said first and second rotor discs and said first and second stator discs will rise to a higher temperature and cool more quickly than said plurality of rotor discs and said plurality of stator discs.

7. The brake disc stack according to claim 6, wherein rates of heat dissipation at said first and second ends of the stack exceed a rate of heat dissipation in said center portion of the stack.

8. The brake disc stack according to claim 7, wherein said first and second rotor discs are of a first thickness, and said first and second stator discs are of a second thickness.

9. The brake disc stack according to claim 8, wherein each of said plurality of rotor discs is of a third thickness, and each of said plurality of stator discs is of a fourth thickness.

10. The brake disc stack according to claim 9, wherein said first and second thickness are less than each of said third and fourth thickness.

11. The brake disc stack according to claim 10, wherein said first thickness is less than said second thickness, and said third thickness is less than said fourth thickness.

12. The brake disc stack according to claim 11, wherein said rate of heat dissipation at said first end exceeds said rate of heat dissipation at said second end.

13. The brake disc stack according to claim 11, wherein said third thickness is between 1.2 and 1.5 times said first thickness, and wherein said fourth thickness is between 1.2 and 1.5 times said second thickness.

* * * * *